United States Patent
Bramberger et al.

(10) Patent No.: US 12,209,422 B2
(45) Date of Patent: Jan. 28, 2025

(54) CONSTRUCTION AND/OR MATERIALS-HANDLING MACHINE AND METHOD FOR GUIDING AND MOVING A WORKING HEAD

(71) Applicant: Liebherr-Werk Biberach GmbH, Biberach an der Riss (DE)

(72) Inventors: Robert Bramberger, Biberach an der Riss (DE); Martin Kögl, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 685 days.

(21) Appl. No.: 17/450,010

(22) Filed: Oct. 5, 2021

(65) Prior Publication Data

US 2022/0032500 A1 Feb. 3, 2022

Related U.S. Application Data

(63) Continuation of application No. PCT/EP2020/059351, filed on Apr. 2, 2020.

(51) Int. Cl.
| | |
|---|---|
| *E04G 21/04* | (2006.01) |
| *B28B 1/00* | (2006.01) |
| *B33Y 10/00* | (2015.01) |
| *B33Y 30/00* | (2015.01) |
| *B66C 13/48* | (2006.01) |
| *B66C 17/06* | (2006.01) |

(Continued)

(52) U.S. Cl.
CPC .......... *E04G 21/0427* (2013.01); *B28B 1/001* (2013.01); *B33Y 10/00* (2014.12); *B33Y 30/00* (2014.12); *B66C 13/48* (2013.01); *B66C 17/06* (2013.01); *B66C 23/283* (2013.01); *B66C 2700/03* (2013.01); *B66C 2700/0385* (2013.01); *E04B 1/16* (2013.01)

(58) Field of Classification Search
CPC ..... E04G 21/0427; B28B 1/001; B66C 13/48; B66C 17/06; B66C 23/283; B66C 2700/03; B66C 2700/0385; B33Y 10/00; B33Y 30/00; E04B 1/16

See application file for complete search history.

(56) References Cited

U.S. PATENT DOCUMENTS

| | | | | |
|---|---|---|---|---|
| 5,848,458 | A | * 12/1998 | Bullen | ................. B23P 21/004 29/33 K |
| 8,029,710 | B2 | 10/2011 | Khoshnevis | |

(Continued)

FOREIGN PATENT DOCUMENTS

| | | |
|---|---|---|
| CN | 102351128 | 2/2012 |
| CN | 103786235 | 5/2014 |

(Continued)

*Primary Examiner* — Mark R Wendell
(74) *Attorney, Agent, or Firm* — Levine Bagade Han LLP

(57) ABSTRACT

The invention relates to a method and a construction and/or a materials-handling machine for guiding and moving a working head, in particular a 3D print head, wherein at least three revolving tower cranes are attached to each other with their booms, wherein according to one aspect of the invention a guide beam carrying the working head is attached to at least two trolleys of two revolving tower cranes, and the working head is adjusted and moved in its working position by moving the trolleys along two booms of two revolving tower cranes.

37 Claims, 8 Drawing Sheets

(51) Int. Cl.
*B66C 23/28* (2006.01)
*E04B 1/16* (2006.01)

(56) References Cited

U.S. PATENT DOCUMENTS

2018/0345533 A1    12/2018  Hernandez et al.
2021/0347614 A1*   11/2021  Bramberger ............ E04G 21/16

FOREIGN PATENT DOCUMENTS

| | | |
|---|---|---|
| CN | 104453227 | 3/2015 |
| CN | 206477589 U | 9/2017 |
| CN | 109129819 | 1/2019 |
| CN | 106401194 | 3/2019 |
| DE | 1167500 | 4/1964 |
| DE | 1259537 | 1/1968 |
| DE | 3223169 | 12/1983 |
| DE | 102009050729 | 4/2011 |
| DE | 102014015335 | 8/2016 |
| FR | 2967526 | 5/2012 |
| KR | 1020190014287 | 2/2019 |
| WO | WO 2005/097476 | 10/2005 |
| WO | WO 2015/135645 | 9/2015 |
| WO | WO 2020/201400 | 10/2020 |

* cited by examiner

Double boom system

Adapting to different house shapes and sizes

CONSTRUCTION AND/OR MATERIALS-HANDLING MACHINE AND METHOD FOR GUIDING AND MOVING A WORKING HEAD

CROSS-REFERENCE TO RELATED APPLICATIONS

This application is a continuation of International Patent Application Number PCT/EP2020/059351 filed Apr. 2, 2020, which claims priority to German Patent Application Number DE 10 2019 109 019.9 filed Apr. 5, 2019, both of which are incorporated herein by reference in their entireties.

BACKGROUND

The present invention relates to construction and/or materials-handling machine for constructing a structure and/or manipulating a workpiece, having a work head that is mounted on a support structure so as to be movable. The invention further relates to a method for guiding and moving a working head, in particular in the form of a 3D print head.

In recent times attempts have been made to build larger structures such as bridges, entire houses or other buildings using additive manufacturing processes. In such a process, a working head for disposing of a building material is repeatedly reciprocated, for example along a building wall to be erected, in order to apply layer after layer. Such devices are often collectively referred to as 3D printers, the working head of which may be a material application head such as a concrete injection head. Depending on the material from which the building structure is to be built, however, these can also be other working heads, for example foam injection heads or multi-component injection heads, for example if building walls to be thermally insulated are to be produced in a sandwich process from a foam core and wall plaster to be applied on top.

3D printers have so far been used mainly on what is actually a smaller scale, particularly in industrial manufacturing carried out inside factory floors. In order to be able to move the 3D print head precisely in three-dimensional space and, for example, to be able to create a relief-like contour, gantry robots are often used, which can achieve a fairly high level of accuracy with a fairly large working area. Such a gantry robot is shown, for example, in U.S. Pat. No. 8,029,710 B2. For the guiding of the 3D print head, in smaller applications, there are often used jointed arm robots.

In order to make such jointed arm robots suitable for construction sites, it has also already been proposed to relocate them onto a crawler chassis, cf. US 2018/0345533 A1. Due to their limited range, such jointed arm robots, even if they can be moved around a construction site by means of a crawler, can hardly be used to erect larger structures such as a multi-storey house, at least not with the desired precision. If the boom-like articulated arm is extended accordingly, there can occur torsion and therefore positioning inaccuracies, since the jointed arm cannot be dimensioned to be as massive as required in order to prevent the crawler chassis from falling over.

In order to be able to guide a working head over a sufficiently large travel range and to be able to use it, for example, for multi-storey buildings, the document CN 109129819 A proposes that a gantry crane-like support structure for the working head be attached to the building façade of the building to be erected. In the process, support columns are attached to the outer façade, which act as lifting supports. By means of spindle drives, portal columns can be moved vertically on the support columns attached to the façade, which support two longitudinal rails above the building, on which a cross beam carrying the working head can be moved. By relocating said support columns on the outer façade, the support structure can grow with the building, although such relocation is very costly and requires a lengthy retrofitting process.

Nevertheless, said approaches all involve disadvantages in practice and cannot equally satisfactorily meet the diverging requirements, namely a very long range and yet high positioning accuracy as well as quick and easy setup despite often impassable construction site terrain. This is all the more true when it is necessary to adapt the construction and/or materials-handling machine to different building sizes and to move it quickly from one building to another. Since additive manufacturing processes are often only used to produce specific sections of a building, this often results in only short, quick tasks to do for a corresponding 3D printer that require the machine to be able to be quickly transported from one construction site to another.

It is the underlying object of the present invention to provide an improved construction and/or materials-handling machine of said type and an improved method for guiding and moving a working head that avoid disadvantages of the prior art and advantageously further develop the latter. In particular, a device and a method for the positionally accurate movement of a working head over a wide working range are to be created, which can be easily adapted to different building sizes and quickly moved from one construction site to another.

Said task is solved, in accordance with the invention, with method as claimed in claims 1 and 2 and a construction and/or materials-handling machine as claimed in claim 3. Preferred embodiments of the invention are the subject-matter of the dependent claims.

SUMMARY

It is therefore proposed to move and position the working head by means of several revolving tower cranes, which at first seems not very effective in view of the requirement for high positioning accuracy. However, in order to be able to tackle this shortcoming, in a special way there is used a plurality of revolving tower cranes. According to the invention, at least three revolving tower cranes are attached to each other with their booms. In a first aspect, a guide beam carrying the working head can be attached to at least two trolleys on the revolving tower cranes stabilizing each other in this way, so that the working head can be adjusted in its working position by moving the trolleys along two booms.

As the revolving tower cranes are attached to each other with their booms, the horizontal booms form a gantry-like support structure that can stabilize the revolving tower cranes mutually. By the movable linkage of a cross beam to at least two booms, a further stabilization is achieved, which allows a sufficiently high positioning accuracy.

In particular, the revolving tower cranes can be set up in such a way that the booms extend in rows from tower to tower and/or together form a closed polygon. In particular, the booms may define a polygon corresponding to the number of cranes, i.e. a triangle for three revolving tower cranes, a quadrilateral for four revolving tower cranes, and so on.

In further embodiments of the invention, in particular, four revolving tower cranes may have their booms attached to each other so that the booms may define a rectangle, in particular a square. Advantageously, the revolving tower cranes are arranged so that at least two booms of two revolving tower cranes extend parallel to each other. A cross beam can be mounted on the two parallel booms in a simple manner so that it can be moved, in particular it can be rigidly attached directly to the trolleys of the booms so that the crossbeam can be moved precisely along a double rail guide which is formed by the two parallel booms.

In principle, however, it would also be possible, for example when using a telescopic cross beam, to use two booms that are not aligned exactly parallel or booms that are spread slightly in a V-shape as a rail guide for the cross beam.

As is common with revolving tower cranes per se, the booms may each be rotatable about an upright slewing gear axis relative to the tower or together with the tower supporting the boom, wherein rotation of the tower and/or boom relative to the tower may be effected by an appropriate slewing gear drive, for example an electric motor driving a pinion gear which engages a ring gear. Due to said rotatability of the booms, said booms can be positioned appropriately relative to each other in a simple manner when setting up the support structure for the working head.

In a further embodiment of the invention, the booms are each attached by their front end sections to a respective next revolving tower crane, wherein the attachment of the boom tip or the front end section to the tower of the respective next crane and/or to its boom can preferably take place in the vicinity of the tower.

In order to enable a quick connection and a quick disconnection of the attachments of the revolving tower cranes from each other, in an advantageous further development of the invention quick-hitches or quick couplings may be provided between the revolving tower cranes, which enable a positive and/or non-positive locking of a respective front end section of the respective boom to the respective next crane, in particular its tower and/or its boom.

In particular, such mechanical quick-hitches or quick couplings may have movable latching elements and matching positive locking contours on end sections of the booms and cooperating connecting sections on the next crane. For example, a latching head can be provided on the tower and/or a section of the boom and/or counter boom of a respective revolving tower crane adjacent thereto, to which another crane can be docked with the end section of its boom, in particular can be connected in a form-fitting manner. For example, a coupling shoe can be mounted on the tower and/or boom and/or counter boom of one crane, into which coupling shoe the tip of the boom of the other crane can be suitably inserted.

Movable latching elements, such as extendable locking bolts or wedge-shaped retaining latches, may provide a positive and/or non-positive means for securing and/or catching of the cantilever end section on the counterpart of the other crane.

Said latching elements may, for example, be hook-shaped pivot bolts and/or comprise translationally displaceable locking bolts.

Advantageously, said quick couplings can each be switched between a rigid latching state, which does not permit any relative movements, on the one hand, and a damping and/or yielding holding state, on the other hand. For example, the respective quick coupling may comprise two coupling halves which can be moved against each other, at least one of which is attached, for example by means of spring elements or other resilient and/or movable elements, to the associated connection part, namely to the cantilevered end section of the boom and/or the counterpart of the adjacent crane, in particular its tower. In said damping and/or compliant coupling mode, the respective boom is still hinged to the tower or adjacent structural section of the next crane, but can move in a limited manner. In this moving mode, the entire support frame structure, that is, the revolving tower cranes can be moved together, allowing certain compensating movements, for example, when the support frame structure comprising the revolving tower cranes is moved from one building section to an adjacent building section.

In order to block the compliance of the respective quick coupling in order to achieve the highest positioning accuracy in the working mode of the working head, the compliant elements, for example said springs, can be blocked, for example by extending a latch.

Said quick couplings can be designed to be statically load-bearing in the rigidly locked latching state, in particular, in order to minimize deflection of the interconnected booms. If the booms to be connected have longitudinally extending upper and lower load-bearing straps in a conventional manner, said quick coupling can latch together both the upper and lower load-bearing straps of two booms to be connected. The upper load-bearing strap of one boom may be interlocked with the upper load-bearing strap of the other boom, and the lower load-bearing strap of one boom may be interlocked with the lower load-bearing straps of the other boom, so that an overall stable, static load bearing connection is provided between the booms.

Alternatively or additionally, said quick couplings may also comprise additional stiffening elements which, in the manner of a stiffening sleeve, connects a section of one boom to a section of the other boom and can be stiffened, in particular slid over it. For example, such stiffening elements in the manner of a rail or sleeve or bandage may, for example, connect and stiffen the upper load-bearing strap of one boom to the upper load-bearing strap of the other boom. Similarly, a stiffening member may be provided for one or each of the lower load-bearing straps.

In order to be able to move the working head not only longitudinally along the revolving tower crane boom, in a further embodiment of the invention a movable carriage is mounted on the said longitudinally movable cross beam, which carriage carries the working head. Said transverse carriage can be moved along the cross beam by means of a transverse drive in order to be able to move the working head in the transverse direction to different, desired working positions.

The height or depth adjustment of the working head can be done in different ways. In particular, in order to be able to carry out or adjust fine height movements of the working head, a working head support can be mounted so as to be movable in height relative to the said transverse support, in particular to the transverse slide. Said headstock may, for example, be hinged to said cross slide by means of an upright extending telescoping support. Alternatively or additionally, the upright extending headstock may be moved in an upright direction on said cross slide, for example by a rack and pinion drive or other suitable adjustment drive.

Alternatively or additionally, height movements of the working head can also be generated by a height adjustment on the part of the tower crane, in particular by a height-adjustable tower to which the boom of the crane is attached. In particular, a telescopically designed tower may be provided, wherein advantageously each of the plurality of revolving tower cranes may have such a height-adjustable, in particular telescopically designed tower, in order to be able to move the booms attached to each other or the horizontal support structure formed thereby upwards or downwards by synchronously adjusting the tower height.

Alternatively, or in addition to such telescoping capability of the crane towers, the crane towers may also be lengthened by climbing in or otherwise attaching additional tower sections, or shortened by climbing out or removing corresponding tower sections. Advantageously, the respective revolving tower crane can have a climbing-in device for this purpose, which enables tower sections to be climbed in easily and quickly. For this purpose, a climbing guide piece may be provided which may hold a tower piece relative to another tower piece or a tower base and at the same time allow a tower piece to be displaced longitudinally relative to the climbing piece, which may be done, for example, by a hydraulic cylinder. The said climbing piece bridges, so to speak, the resulting gap or free space to the next tower piece or to the tower base during the displacement of the held tower piece, so that a new tower piece can be inserted from one side and then connected to the tower piece held by the climbing piece. Such climbing devices for revolving tower cranes are known per se, so that in this respect reference may be made, for example, to the document WO 2015/135645 A1.

Once the respective revolving tower crane has reached its maximum height, for example by telescoping or by inserting corresponding tower sections, the tower of the crane can be dismantled from its slewing platform and/or its undercarriage and anchored to the already erected building façade by means of building anchors in order to be able to grow further with the building in this way. For example, a tower section below the climbing device can first be anchored to the façade with one or more building anchors so that another tower section can be climbed in. By moving or attaching additional building anchors to a building section or tower section further up, the tower can continue to grow piece by piece while attached to a building section. An analogous approach can be taken with a telescopic tower, which can be anchored alternately to its articulated shot and its telescopic shot.

By skilfully repositioning the building anchors, the arrangement of the revolving tower cranes, which form the load-bearing structure for the working head, can grow not only vertically with the building, but also horizontally, if a nested building is to be erected with parts of the building offset horizontally in relation to each other.

Alternatively or additionally, horizontal extension or relocation of the support structure may also be accomplished by attaching an additional revolving tower crane to the already erected building, for example on an erected building landing, wherein the tower of the new crane may also be attached to the respective building section by means of building anchors. The boom of the new crane can be connected to the boom or tower of one of the other cranes already assembled to extend the support structure horizontally.

An auxiliary assembly crane can be helpful here, which can take the form of an additional boom on one of the cranes that is part of the support structure. Such an auxiliary crane integrated into the support structure or a separate auxiliary crane can also be used in supplying the construction site, which has grown in height, with building materials and/or tools and/or other materials.

In order not to be limited with the traversability of the working head along said cross member to the polygonal area spanned by the interconnected booms, in an advantageous further development of the invention said cross member can project beyond at least one of said booms and form a traversing path for said cross member carrying the working head, which traversing path extends both inside and outside the polygon spanned by the booms. This allows the working head to be moved to the outside of the supporting frame structure, so to speak, in order to be able to carry out work outside the triangle, quadrilateral or polygon spanned by the crane booms and also to be able to erect parts of the building outside the said spanned polygon.

Advantageously, said boom can be designed to project beyond the respective crane boom at its two ends in order to be able to work outside the polygon spanned by the booms towards opposite sides.

The cantilevered portion of the cross member may be formed by a rigid gate of the cross member. Alternatively, the cantilevered portion may be a telescoping portion of the cross member.

In order to be able to work also transversely to the longitudinal direction of the cross member beyond the polygon spanned by the booms, said cross member, which is movable along the cross member, may in turn support a cross member or beam which may extend substantially perpendicularly or transversely to the first-mentioned cross member, the working head being movably mounted on said cross member by a carriage or similar suspension. If the cross beam is moved along the crane booms from which it is suspended very close to the towers supporting the booms, the said crossbeam may project beyond the line joining the two towers, so that the working head can also be moved in this direction beyond the polygon spanned by the crane booms.

In order not to introduce tilting moments or excessive tilting moments into the crossbeam via said crossbeam, the cross beam can carry two working heads which can be moved in opposite directions or one working head and a ballast weight which can be moved in opposite directions in order to balance the cross beam with respect to its pivot point on the crossbeam.

Alternatively, or in addition to such a cross member being suspended from said cross member, it would also be possible to suspend two or more working heads from two separate, unconnected cross members, advantageously the two cross members may extend perpendicularly to each other or transversely to each other. In this case, in order not to collide with each other, said cross members may be arranged at different heights.

If, for example, four revolving tower cranes are connected with their booms in such a way that they span a rectangle, the two cross beams can each be suspended from two opposite booms or the trolleys provided there, so that the cross beams—viewed from above—cross each other or span a cross. One of the cross beams can be suspended higher than the other cross beam, so that the cross beams can be moved away one above the other. This can be achieved, for example, by installing a height spacer between the cross member and the respective trolley. Alternatively or additionally, it would also be possible to arrange the booms in pairs at different heights.

In order to be able to move the support frame structure formed by the revolving tower cranes for the working head quickly from one construction site to the next construction site or also to be able to move it quickly within one and the same construction site, at least one of the plurality of revolving tower cranes can be designed as a mobile crane, the tower of which is arranged on a slewing platform which can be mounted rotatably about an upright axis on an undercarriage which has an undercarriage and advantageously has its own travel drive in order to be self-propelled.

Such a traction drive may include, for example, an internal combustion engine such as a diesel engine or an electric motor.

Advantageously, a ballast weight for absorbing tipping moments can be provided on said superstructure or the revolving stage to which the tower is hinged, which can rotate with the revolving stage and balance the crane independently of its rotational position.

Alternatively, or in addition to such a ballast on the slewing platform, however, the tower slewing crane may include a counter boom extending on the tower in the opposite direction from the boom and capable of supporting a ballast weight.

Advantageously, the tower may be hinged to said rotating platform to tilt or luff about a horizontal axis so that it can be moved from an upright working position to a horizontal transport position. For this purpose, a luffing drive, for example with hydraulic cylinders, can be provided between the rotating platform and the tower in order to be able to raise and lower the tower about the horizontal swivel axis.

Such a mobile crane can have differently designed undercarriages. For example, a multi-axle wheeled undercarriage may be provided, wherein one of the wheel axles or more wheel axles may be driven by the traction drive. Advantageously, at least one axle is steerable. However, as an alternative to or in addition to wheel axles, the undercarriage may also have a crawler undercarriage so that the mobile crane can be moved by driving the undercarriage tracks. Such a crawler chassis is particularly advantageous on rough construction site terrain in order to be able to move the revolving tower crane safely even on deep, muddy ground or on larger unevenness or sloping terrain.

The polygonal tensile supporting frame structure for the working head spanned by the booms of the revolving tower cranes can be used not only for storing and moving said working head, but also for roofing the space to be worked by the working head. In particular, the booms may support a spanable roof which may span the interior space of the polygonal profile spanned by the booms, such a roof being able to cover all or part of said interior space. Such a spannable roof may, for example, comprise a sheet-like textile and/or foil structure and/or hybrid roof structures comprising sheet-like foil and/or textile materials and load-bearing frames.

Advantageously, such a spannable roof can be designed to be retractable and extendable in order to be able to reduce the large area of the roof in the event of stronger wind loads. For example, in the manner of a sun awning or roller blind, a retractable and unrollable roof may be provided, wherein a winding roller may be provided on one of the booms or between two booms to allow the roofing material to be rolled in and unrolled.

Alternatively or additionally, a folding roof may be provided, which may have spaced-apart articulation points on two opposing booms, each of which may be displaceably mounted there with slide pieces, so that the roof can be folded to one side in the manner of a fanfold.

Advantageously, such a roof may be hinged to upper sides of the booms, for example supported and/or slidably mounted on the upper chords of the booms.

In order to protect the working area of the working head also from lateral influences such as wind, rain and the like, as an alternative or in addition to a roof, at least one side wall may also be attached to the revolving tower cranes forming the supporting frame structure for the working head, covering at least part of the ripping surface between at least two towers. In particular, the booms and/or adjacent towers may each support a spanable sidewall which may at least partially span the interior space between two towers and the boom connecting the towers and extend substantially upright.

Such a spannable sidewall may, for example, comprise a sheet-like textile and/or foil structure and/or hybrid roof structures comprising sheet-like foil and/or textile materials and load-bearing frames.

Advantageously, such a protective wall can be designed to be retractable and extendable in order to be able to reduce the area exposed to the wind in the event of stronger wind loads. For example, in the manner of a sun awning or roller blind, provision can be made for a retractable and unrollable protective wall, wherein a winding roller can be provided lying on one of the booms or standing on one of the towers in order to be able to roll in and unroll the side wall material.

Alternatively or additionally, a folding wall in the manner of a curtain or a Venetian blind may be provided, which may have spaced-apart articulation points on a boom or on two adjacent towers, each of which may be displaceably mounted there by means of slide pieces, so that the side wall may be folded upwards in the manner of a fanfold towards the boom or to one side towards the tower there.

In order not to span an unnecessarily large support frame structure, in an advantageous further development of the invention, the booms of the revolving tower cranes may also be designed to be telescopic and/or adjustable in length, for example by adding or removing boom parts. In particular, a telescopic boom design can also compensate for tolerances or errors in the spacing between adjacent towers.

If a house larger in footprint is being built, the booms can be extended, while to build a house smaller in footprint, the booms can be retracted and the towers moved together. Advantageously, length-adjustable booms can also be used to easily achieve adaptations to different floor plan shapes. For example, if a square house is being built, all booms can be set to the same length, while two booms can be set longer and two booms can be set shorter if an oblong, narrow house is being built.

According to another aspect of the present invention, the revolving tower cranes attached to each other can also be used to adjust the working head by means of ropes and/or to carry a rope robot. In particular, a system of cables comprising at least three control cables may be attached to the at least three revolving tower cranes attached to each other by their booms, in particular to the towers and/or to the booms. In this context, cable winches for adjusting said system of cables relative to the revolving tower cranes attached to each other and/or relative to the working head can be provided and can be controlled by an electronic control device for moving the working head.

By lowering or retracting the ropes by means of rope winches, the system of cables can be adjusted relative to the support structure defined by the revolving tower cranes attached to each other and thus the working head can be moved. If necessary, the system of cables can also be adjusted relative to the working head, for example by a cable winch provided on the working head, such as a capstan winch. Through coordinated lowering and retracting of the ropes, for example synchronously to each other or in opposite directions to each other, the working head can be selectively moved in the vertical direction and/or in the horizontal direction.

Advantageously, the system of cables in this case comprises a high-strength fiber rope, which may consist of high-strength synthetic fibers such as aramid fibers (HMPA), aramid/carbon fiber mixtures, high-modulus polyethylene fibers (HMPE), or poly(p-phenylene-2,6-benzobisoxazole)

fibers (PBO), or may at least comprise such fibers. The use of such high-strength fiber ropes not only reduces the weight of the system of cables itself but also facilitates a reduction in the construction weights of the components that is is loaded with and the masses moved, which on the one hand leads to an increase in the working load of the application and on the other hand, above all, makes it easier to comply with the axle loads permissible for road transport even in the case of a smaller number of axles. At the same time, the positioning accuracy of the working head can be improved by the low elongation of such fiber parts. In addition, the fibre rope is less susceptible to interference from wind-induced transverse oscillations, so that when the weather conditions are not always perfect, out in the open, the working head can be positioned with greater precision.

For its function as a support structure part, an articulation point for a control cable of the cable robot can be provided on the tower of the revolving tower crane, for example by a pulley block in an upper portion of the tower and/or by a cable winch, which can be mounted in an upper portion of the tower. Advantageously, several articulation points for several control cables can also be attached to the tower of the revolving tower crane, for example in the form of pulley blocks offset higher or lower relative to one another, via which the control cables are diverted to cable winches at the base area of the tower. The tower of the crane can therefore form a support column for the system of cables. Alternatively or additionally, an articulation point for the system of cables can also be mounted on the boom of the crane.

Irrespective of whether the working head is moved by the previously described crossbeam structure with a crossbeam movably mounted on the boom, or via said system of cables, in further development of the invention, a higher-level control system can advantageously be provided which coordinates the corresponding drives of the revolving tower cranes and/or of the rope winches of the system of cables with one another and/or coordinates them with one another.

The control device, which moves the working head in the required manner and for this purpose actuates the cable winches, by means of which the cables of the system of cables are adjusted, can in principle be structured in different ways, wherein advantageously said control device is of electronic design and in particular can have a microprocessor, which can process a control programme, which can be stored in a memory device. The control device can automatically or semi-automatically follow a predetermined travel path of the working head, for example a straight, horizontal path or an ascending or descending curved movement, which can be specified, for example, on the basis of a BIM model. Alternatively or additionally, the control device can also react to input commands from a machine operator and convert these into a corresponding positioning movement of the working head by the control device converting the input commands, for example tilting or moving a joystick in a given direction, into corresponding rotary movements of the cable winches.

Said control device can have a modular design, in particular have a local control device on each of the mobile units comprising a support column with at least one cable winch or configured as a crane, which controls the at least one cable winch and/or monitors the load or the tilting moment acting on the respective unit and, if necessary, shuts down the installation if there is a risk of a movement or load that could endanger the stability.

In order to harmonise and coordinate the cable movements on the various support columns or the at least one crane, the control device can further comprise a superordinate control unit, which can be electronically configured in said manner and can comprise a microprocessor, program memory and other components, said superordinate control unit being able to communicate with the local control devices in order to control and operate the respective cable winches in a harmonised manner via said local control units in order to achieve cable movements that are harmonised in the required manner.

Said superordinate control unit can be formed by one of the local control units, which forms a master unit, thus monitoring and/or controlling the other local control units. As an alternative to such a modular control architecture, however, there can also be used a central control device which directly controls the cable winches at the individual units.

BRIEF DESCRIPTION OF THE DRAWINGS

The invention will be explained in more detail in the following with respect to preferred embodiments and to associated drawings. The drawings show.

DETAILED DESCRIPTION

As shown in the figures, the construction and/or materials-handling machine 1 comprises a working head 2 which is displaceably or adjustably suspended from a support frame structure 3 and can be displaced in all three dimensions, as will be explained.

Said working head 2 may be of different design and/or equipped with different working tools, for example in the form of a material application head such as concrete injection head or other manufacturing tool and/or in the form of a workpiece gripper and/or other handling tool such as clamshell gripper, for example to handle different materials such as sand, gravel or bricks. If the working head 2 comprises a material dispensing head, the machine can operate like a 3D printer, whereby in principle different materials or building materials can be dispensed via the material dispensing head, for example concrete, but also alternative building materials such as clay and/or lime mixtures and/or plastics such as, for example, synthetic foams.

Figure 1:
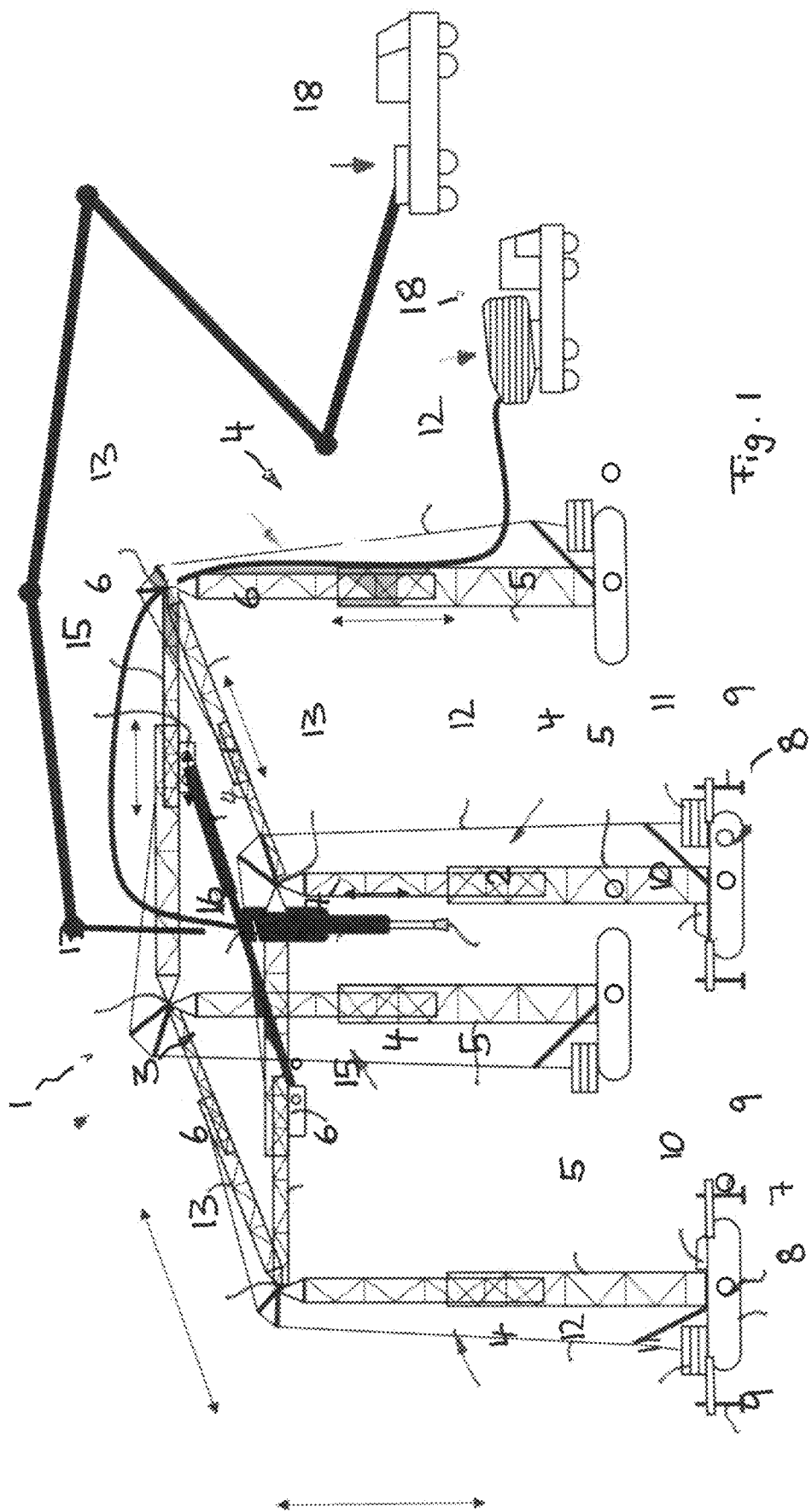
FIG. 1: a perspective view of a construction and/or materials-handling machine with a working head in the form of a concrete injection head, which is movably mounted on a supporting frame structure formed by four revolving tower cranes with booms attached to each other.

As FIG. 1 shows, said support frame structure 3 is formed by a plurality of revolving tower cranes 4, each comprising a tower 5 and a boom 6 supported by the tower 5, and attached to each other.

In particular, the booms 6 of the revolving tower cranes 4 may form a closed ring, understandably polygonal rather than circular, in the manner of a polygonal ring. Each revolving tower crane 4 can point with its boom 6 to the next revolving tower crane in each case, so that the booms 6 extend in turn from revolving tower crane to revolving tower crane.

Each revolving tower crane 4 may in itself be a self-contained and fully functional revolving tower crane, with, for example, the boom 6 being rotatable about an upright slewing gear axis. Depending on whether the tower slewing crane 4 is a bottom-slewer or a top-slewer, the boom 6 may be rotated relative to the tower 5 or together with the tower 5 about the upright slewing axis, and a suitable slewing drive may be provided for this purpose.

In particular, each of the revolving tower cranes 4 may be in the form of a mobile crane, which may be self-propelled in order to be moved from construction site to construction site, or, if appropriate, may be moved only on a construction site itself.

In particular, such a mobile crane may comprise an undercarriage 7 which can be supported and moved on the ground by means of an undercarriage 8, for example in the form of a crawler undercarriage or also a wheeled undercarriage. A corresponding travel drive drives at least one undercarriage axle or the crawler tracks.

As shown in FIG. 1, said undercarriage 7 may be supported on the ground by floor supports 9 in the working position to increase tipping stability. If necessary, a bracing of the tower 5 and/or the boom 6 to the ground may be provided additionally or alternatively.

A rotating platform 10 may be disposed on said undercarriage 7 and rotated relative to said undercarriage 7 about an upright rotation axis. As figurel shows, a ballast 11 may be provided on said rotating platform 10 for balancing the boom 6 and/or loads tugging on the revolving tower crane 4.

Advantageously, the respective boom 6 may be braced to the ballast 11 or the rotating platform 10 via a bracing 12.

In order to be able to move the revolving tower crane 4 in a simple manner from construction site to construction site, the respective tower 5 can advantageously be designed to be adjustable in length, in particular telescopic, wherein a length adjustment drive can comprise, for example, one or more hydraulic cylinders accommodated in the tower or a cable drive.

Advantageously, the boom 6 may be capable of being luffed up and down relative to the tower 5, and in particular may also be capable of being folded against the tower 5 in order to achieve a compact transport configuration, wherein a corresponding luffing drive may be provided here for luffing the boom 6 relative to the tower 5, which luffing drive may comprise, for example, an adjustment of the guy 12.

Advantageously, the boom 6 can also be adjusted in length, in particular telescoped, whereby a corresponding adjustment drive can be provided here, for example comprising one or more hydraulic cylinders or a cable drive.

The tower 5 can be swivelled or luffed down together with the boom 6 from the upright working position into a horizontal transport position and for this purpose is hinged to the said rotating platform 5 so as to be pivotable about a horizontal tower pivot axis. For example, a tower luffing drive may include a hydraulic cylinder between the rotating platform 10 and the tower 5.

As FIG. 1 shows, the revolving tower cranes 4 are attached to each other with their booms 6, whereby each boom 6 can be attached with its cantilevered end section to the tower 5 of the respective next revolving tower crane 4. The attachment may be to the tower 5 itself, or to an adjacent section of the boom 6, or to a mating boom, if any, or to a tower top, if any.

Advantageously, a quick coupling 13 is provided for attaching the boom 6 to the respective adjacent tower of the next crane, which can positively and/or non-positively lock the cantilevered end portion of the boom 6 to the adjacent revolving tower crane 4. Such a quick coupling 13 may comprise retractable and extendable or pivotable locking elements, as already explained in more detail at the outset.

Advantageously, said quick couplings 13 can each be switched between a rigid latching state, which does not permit any relative movements, on the one hand, and a damping and/or yielding holding state, on the other hand. For example, the respective quick coupling 13 may comprise two coupling halves which can be moved against each other, at least one of which is attached, for example by means of spring elements or other resilient and/or movable elements, to the associated connection part, namely to the cantilevered end section of the boom and/or the counterpart of the adjacent crane, in particular its tower 5. In said damping and/or compliant coupling mode, the respective boom 6 is still hinged to the tower or adjacent structural section of the next crane, but can move in a limited manner. In this moving mode, the entire support frame structure, that is, the revolving tower cranes 4 can be moved together, allowing certain compensating movements, for example, when the support frame structure comprising the revolving tower cranes is moved from one building section to an adjacent building section.

In order to block the compliance of the respective quick coupling 13 in order to achieve the highest positioning accuracy in the working mode of the working head 2, the compliant elements, for example said springs, can be blocked, for example by extending a latch.

Said quick couplings 13 can be designed to be statically load-bearing in the rigidly locked latching state, in particular, in order to minimize deflection of the interconnected booms. If the booms to be connected have longitudinally extending upper and lower load-bearing straps in a conventional manner, said quick coupling 13 can latch together both the upper and lower load-bearing straps of two booms 6 to be connected. The upper load-bearing strap of one boom 6 may be interlocked with the upper load-bearing strap of the other boom 6, and the lower load-bearing strap of one boom 6 may be interlocked with the lower load-bearing straps of the other boom, so that an overall stable, static load bearing connection is provided between the booms 6.

Alternatively or additionally, said quick couplings 13 may also comprise additional stiffening elements which, in the manner of a stiffening sleeve, connects a section of one boom 6 to a section of the other boom 6 and can be stiffened, in particular slid over it. For example, such stiffening elements in the manner of a rail or sleeve or bandage may, for example, connect and stiffen the upper load-bearing strap of one boom 6 to the upper load-bearing strap of the other boom 6. Similarly, a stiffening member may be provided for one or each of the lower load-bearing straps.

In order to couple the booms 6 or to engage the quick coupling 13, it is advantageous that the booms 6 are adjustable in length, in particular telescopic, as this allows the cantilevered end sections to be extended in order to engage the coupling halves. Alternatively or additionally, the rocking capability of the booms 6 may be used to engage the quick couplings 13. Alternatively or additionally, a pivoting motion, that is, a rotation of the booms 10 about the upright pivot axis could be used to engage the quick couplings 13.

Figure 2:
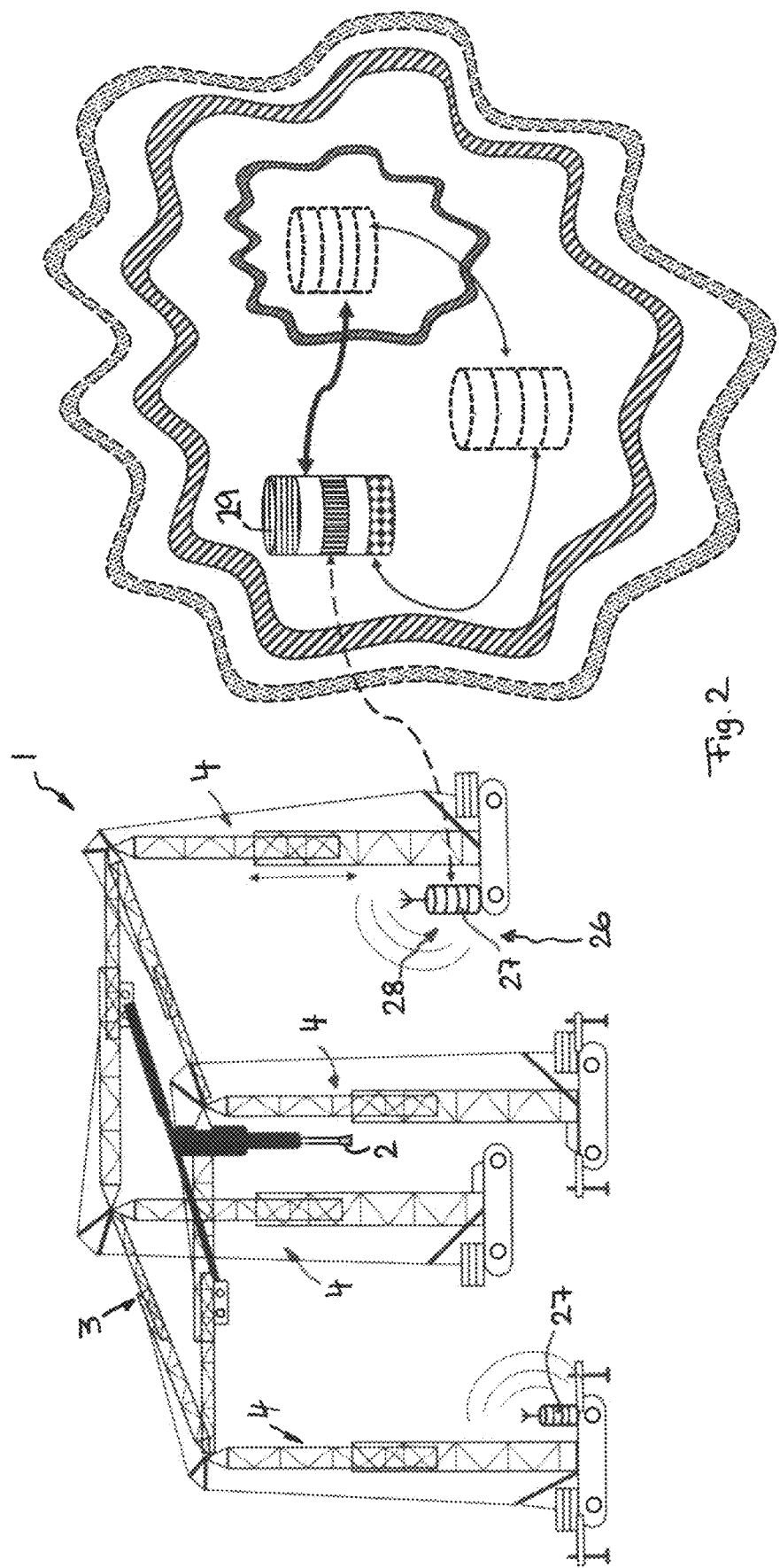
FIG. 2: a perspective view of the construction or materials-handling machine of FIG. 1 together with the control and configuration device implemented in a cloud for controlling and/or configuring the four revolving tower cranes.

As shown in FIGS. 1 and 2, the working head 2 may be suspended from a horizontal cross member 14 which is movably mounted on two preferably parallel booms 6. For this purpose, said cross member 14 may comprise slide or trolley shaped bearing elements at its ends, which may be moved along the respective boom 6.

In particular, however, the trolleys 15 movably arranged on the booms 6 can also be used for suspending said cross member 14 and moving said cross member 14. Via said trolleys 15, hoist cable with load hooks attached or fastened thereto can be lowered and lifted during normal crane operation, and if necessary said load hook can also be used to suspend the cross member 14 from the respective trolley 15. Advantageously, however, the cross member 14 may be rigidly attached to the trolley 15 or may have only very limited movement.

The trolleys 15 may be moved longitudinally along the respective boom 6 by means of a suitable trolley drive, for example a cable drive.

As shown in the figures, the cross member 14 may be designed to be variable in length, in particular telescopic, in order to be able to compensate for parallelism errors or slight misalignments of the booms 6 when the cross member 14 is moved along the booms 6 carrying it and differently spaced boom sections are reached.

The working head 2 may be mounted on said cross member 14 so as to be transversely movable, that is to say movable in the longitudinal direction of the cross member 14. For this purpose, a cross beam carriage 16 may be longitudinally moved on the cross member 14 by a suitable carriage drive.

Furthermore, the working head 2 is advantageously adjustable in height relative to the cross member 14. For example, a length-adjustable and/or height-adjustable upright-extending head support 17 may be provided on said cross beam carriage 16 and may be height-adjusted and/or length-adjusted accordingly by a height-adjusting drive.

If said working head 2 is a material application head, for example a concrete injection head, the material to be applied can be supplied to the working head 2 from a supply source 18, for example from a concrete mixer or from a concrete pump, cf. FIG. 1.

Alternatively or in addition to the described height adjustability of the working head 2 relative to the crossbeam 14, a height adjustment can also be achieved by adjusting the tower heights if the towers 5 of the revolving tower cranes 4 are height adjustable, in particular telescopic, in the manner described.

Advantageously, such a height adjustment of the towers 5 can be used for a rough height adjustment, for example when the next floor of a building is to be manufactured. Fine height adjustment of the working position of the working head 2 can then be made by adjusting the working head 2 relative to the cross member 14.

Figure 3:
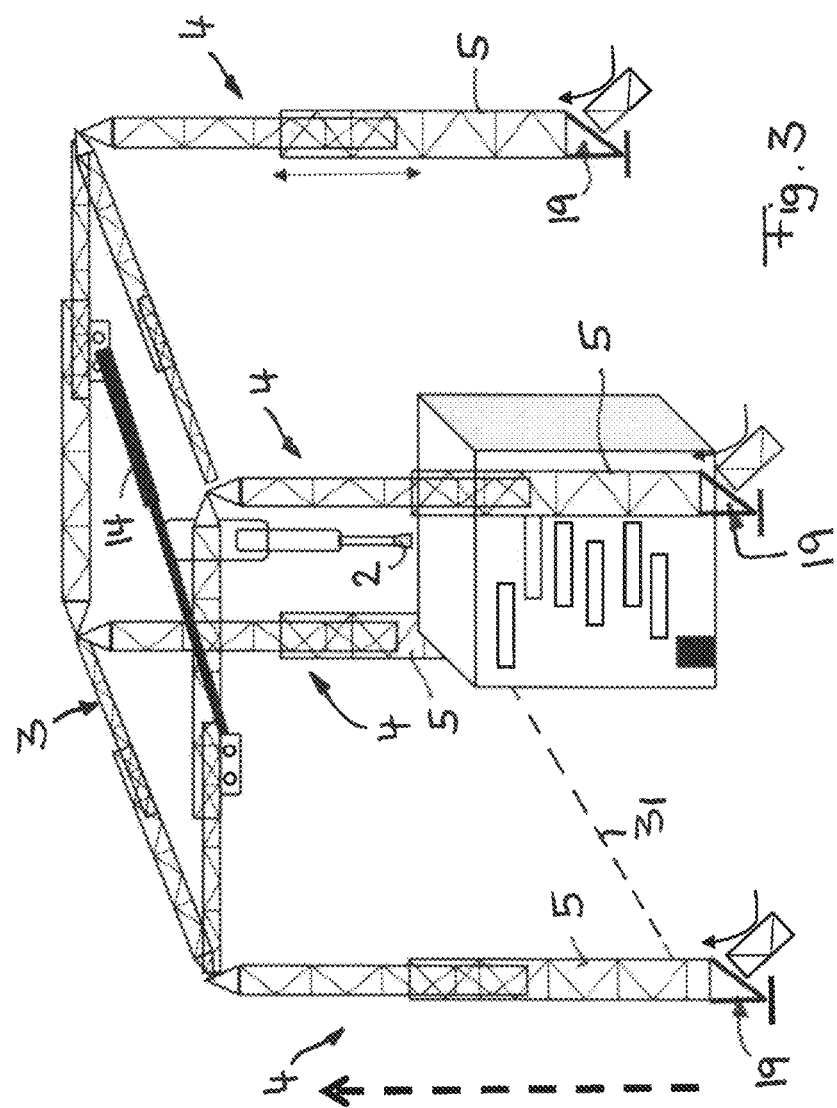
FIG. 3: a perspective view of a support frame structure formed by four revolving tower cranes for a working head similar to FIGS. 1 and 2, wherein the revolving tower cranes are each provided with a climbing-in device for climbing in tower sections in order to be able to adapt the height of the support frame structure on a larger scale to different buildings and their construction heights.

As FIG. 3 illustrates, a height adjustment of the towers 5 of the revolving tower cranes 4 can be achieved on a larger scale by means of a climbing device 19, which allows additional tower sections to be climbed into the tower 5 or, conversely, if the height is to be lowered, allows the tower sections to be climbed out of the tower 5. Such a climbing device 19 may comprise a climbing frame movable along the respective tower 5 for climbing tower pieces in and/or out, wherein a guide is provided for longitudinally movable supporting of the climbing frame relative to the tower or supporting of the tower 5 relative to the climbing frame 20. Said climbing frame 20 may be arranged at the base of the tower 5, but may also be arranged at a higher section of the tower 5. In order to be able to push the already existing tower 5 further upwards for climbing in a new piece, a lifting device may be provided, for example comprising a hydraulic cylinder, in order to be able to raise or lower the tower piece which can be moved relative to the climbing frame, depending on whether an additional tower piece is to be climbed in or climbed down.

By climbing additional tower sections into the towers 5 of the revolving tower cranes 4, these can grow with the building to be erected and buildings of almost any height can be erected. Advantageously, the revolving tower cranes 4 remain supported on the ground, whereby cross bracing towards the building façade can be provided if necessary.

Figure 4:
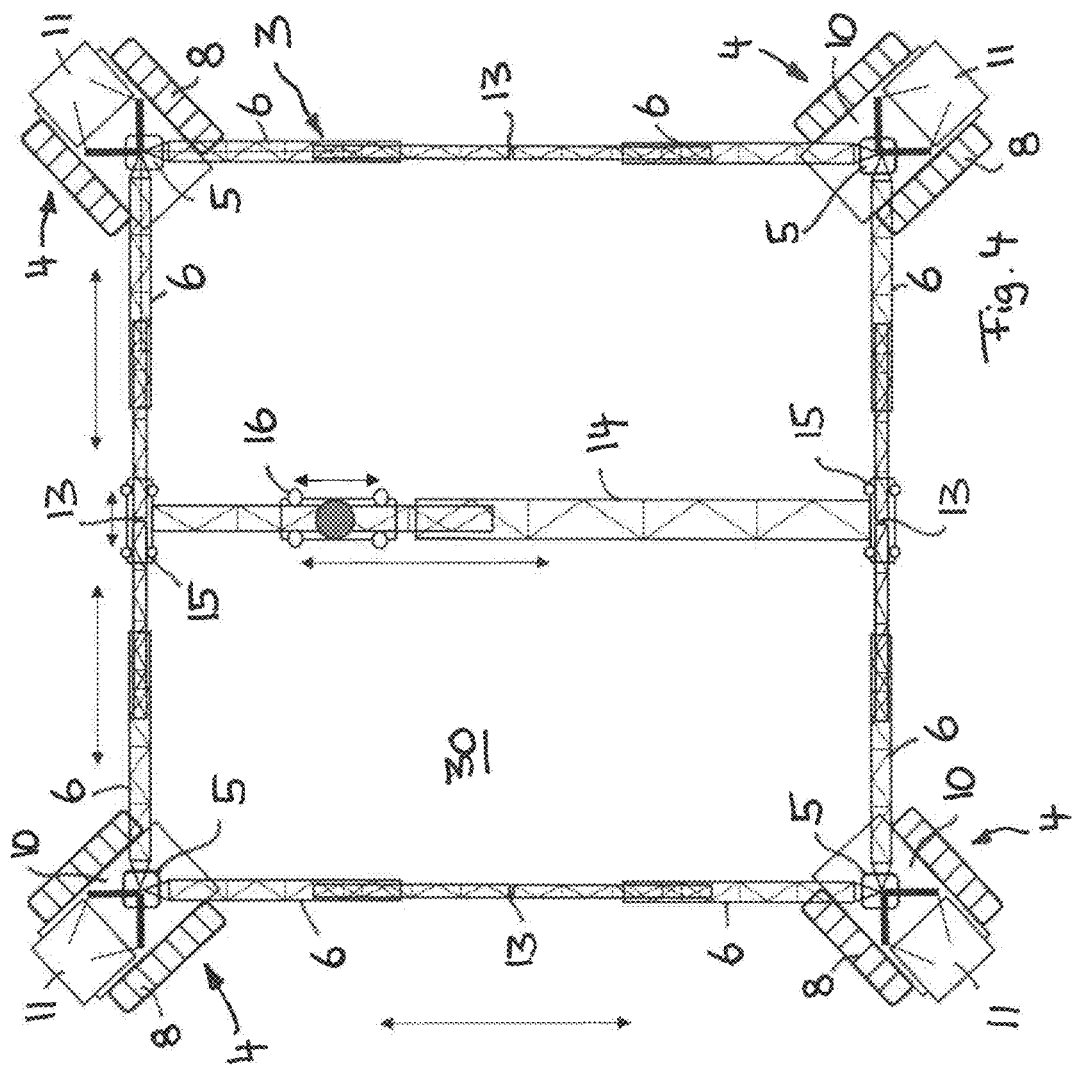
FIG. 4: a top view of a support frame structure formed by four revolving tower cranes similar to the preceding figures, the revolving tower cranes each being provided with a double boom system with telescopic boom sections.
Figure 5:
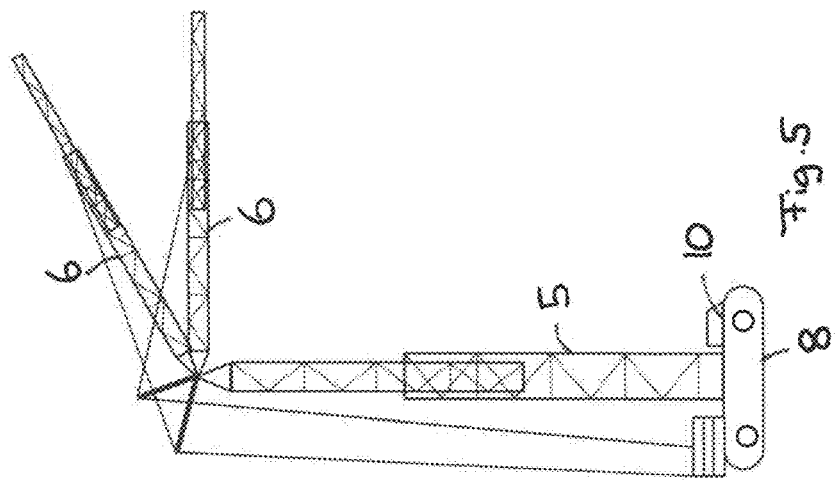
FIG. 5: a side view of one of the revolving tower cranes shown in FIG. 5 to illustrate the double boom system and the luffing action of the boom.

As FIGS. 4 and 5 show, revolving tower cranes 4 with double boom systems may be used, in which case the connection between two adjacent cranes may be made by means of two "half" booms in each case.

As shown in FIGS. 4 and 5, such a tower crane with double boom system may comprise two booms 6 hinged to a common tower 5, which may extend at an angle of 90° with respect to each other, for example, as viewed along the longitudinal axis of the tower 5, although this angle may be different depending on how many revolving tower cranes 4 are clamped together to form a support frame structure 3.

As FIG. 4 shows, the booms 6 of two adjacent revolving tower cranes 4 are directed towards each other so that they extend along a common straight line and are adjacent to each other with their cantilevered end sections. The boom ends, which are adjacent to each other at the end faces, can then be secured to each other by a quick coupling 16 in the manner described.

Also in such revolving tower cranes 4 with double boom, the booms 6 may be designed to be adjustable in length, in particular telescopic, cf. FIGS. 4 and 5.

FIG. 4 illustrates once again in detail the mobility of the working head 2 in plan view. On the one hand, the cross member 14 can be moved longitudinally along opposite, parallel booms 6 via the trolleys 15. On the other hand, the working head 2 can be moved transversely by moving the cross beam carriage 16 along the cross member 14. This allows you to approach any position above the ground plan of the area to be built on. The height adjustment is then accomplished in the aforementioned manner by adjusting the height of the working head 2 relative to the cross member 14 and/or, if necessary, by adjusting the height of the towers 5.

Figure 6:
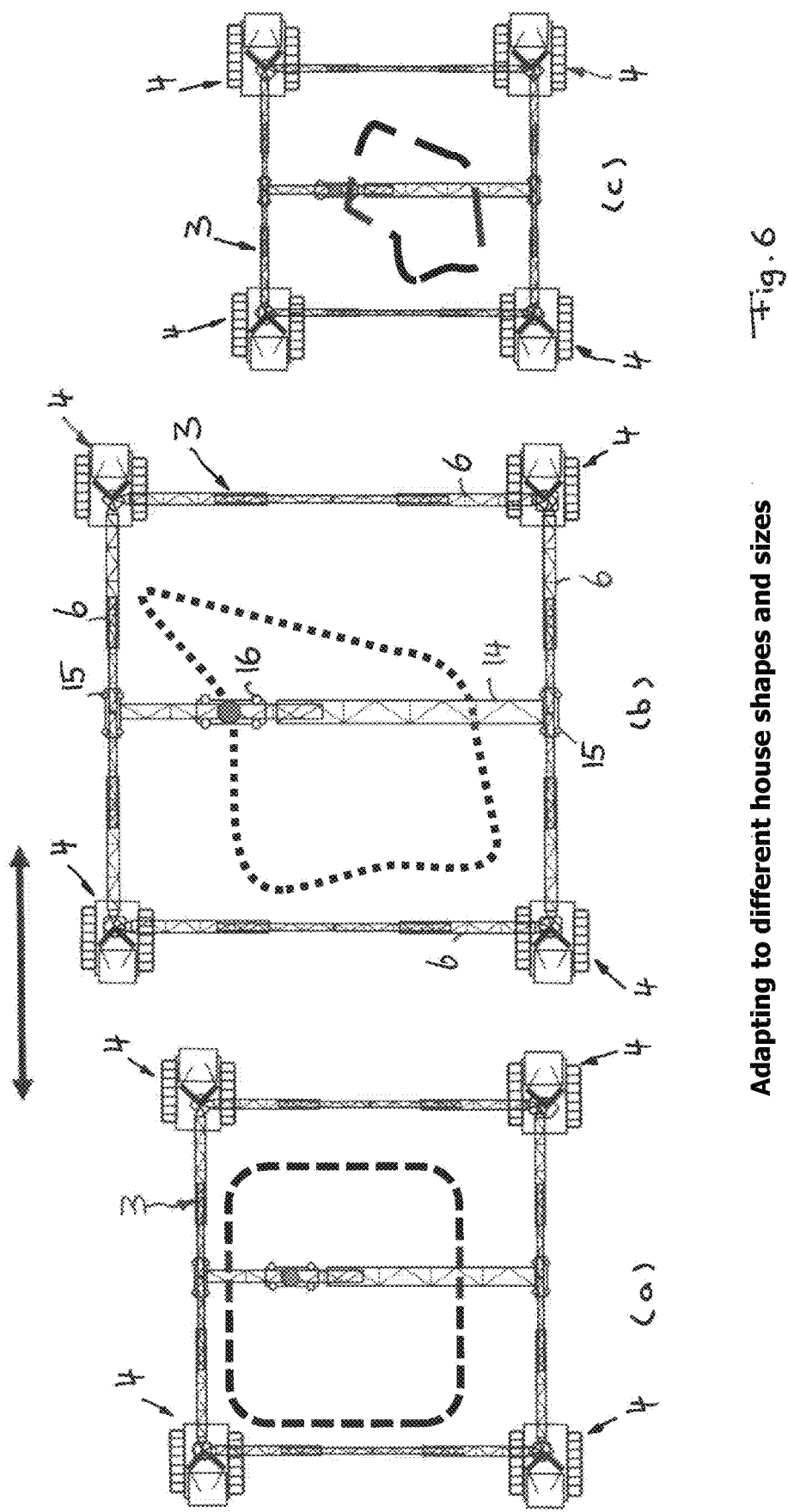
FIG. 6: a plan view of the support frame structure formed by the four revolving tower cranes of FIG. 4, with partial views a, b and c illustrating the adjustment of the support frame structure by extending and retracting the booms.

As FIG. 6 shows, the support frame structure 3 is easily adaptable to different building sizes and floor plan shapes, especially if the booms 6 are adjustable in length. By lengthening or shortening the booms 6, the distances of the towers 5 of the revolving tower cranes 4 from each other can be adjusted in order to erect larger or smaller buildings, whereby here not only square polygonal trains can be realized as shown in the partial views a, b and c of FIG. 6, but also an adaptation from square to rectangular and vice versa can be made, for example by shortening or lengthening only two of the four booms.

Figure 9:
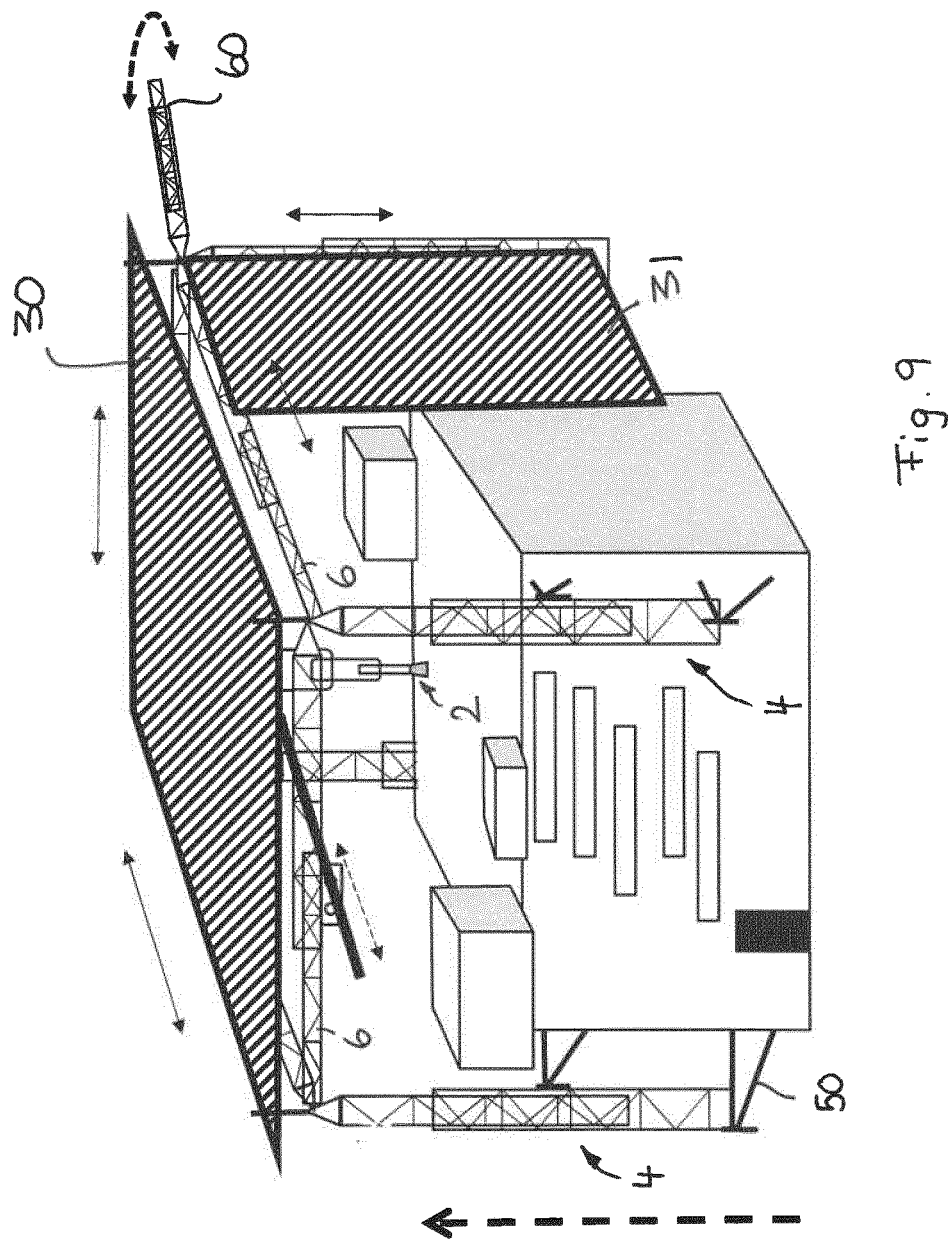
FIG. 9: a perspective view of the supporting frame structure formed by the four revolving tower cranes, similar to FIG. 3, with the towers of the four revolving tower cranes dismantled from the undercarriages of the revolving tower cranes and held by building anchors on the façade of the part of the building already erected.

To protect the working area of the working head 2, the support frame structure 3 may also support a roof 30 spanning the working area, cf. FIG. 4 and FIG. 9, and/or at least one side wall 31 may be attached to the revolving tower cranes 4, cf. FIG. 3 and FIG. 9. The roof 30 and the side wall 31 can be formed in the manner already explained at the beginning and can be attached to the booms 6 and the towers 5, respectively.

Figure 7:
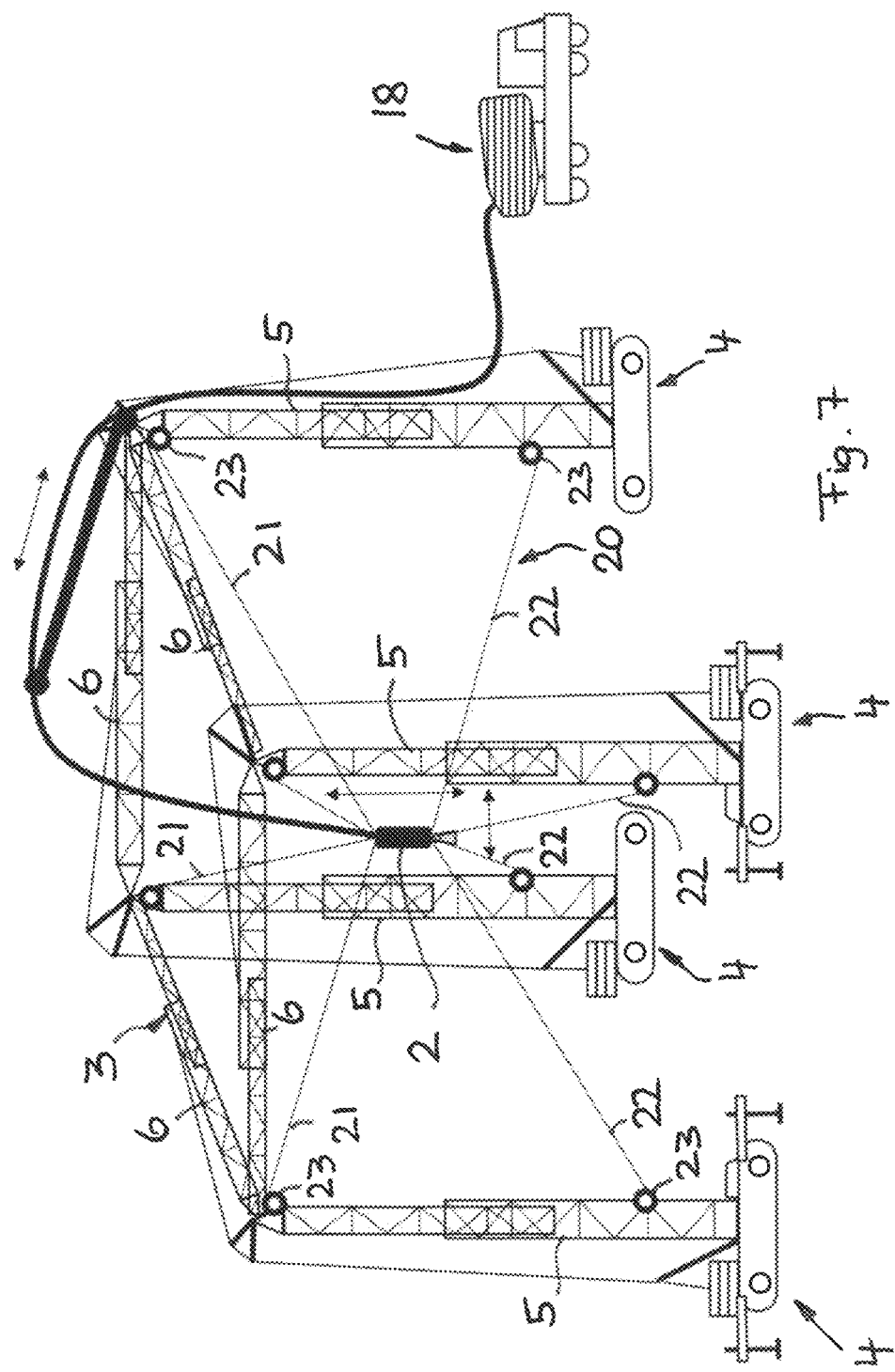
FIG. 7: a perspective view of a support frame structure similar to FIG. 1 formed by four revolving tower cranes attached to each other, the working head being adjustable relative to said support frame structure by means of a stranding comprising control cables attached to the towers of the revolving tower cranes.
Figure 8:
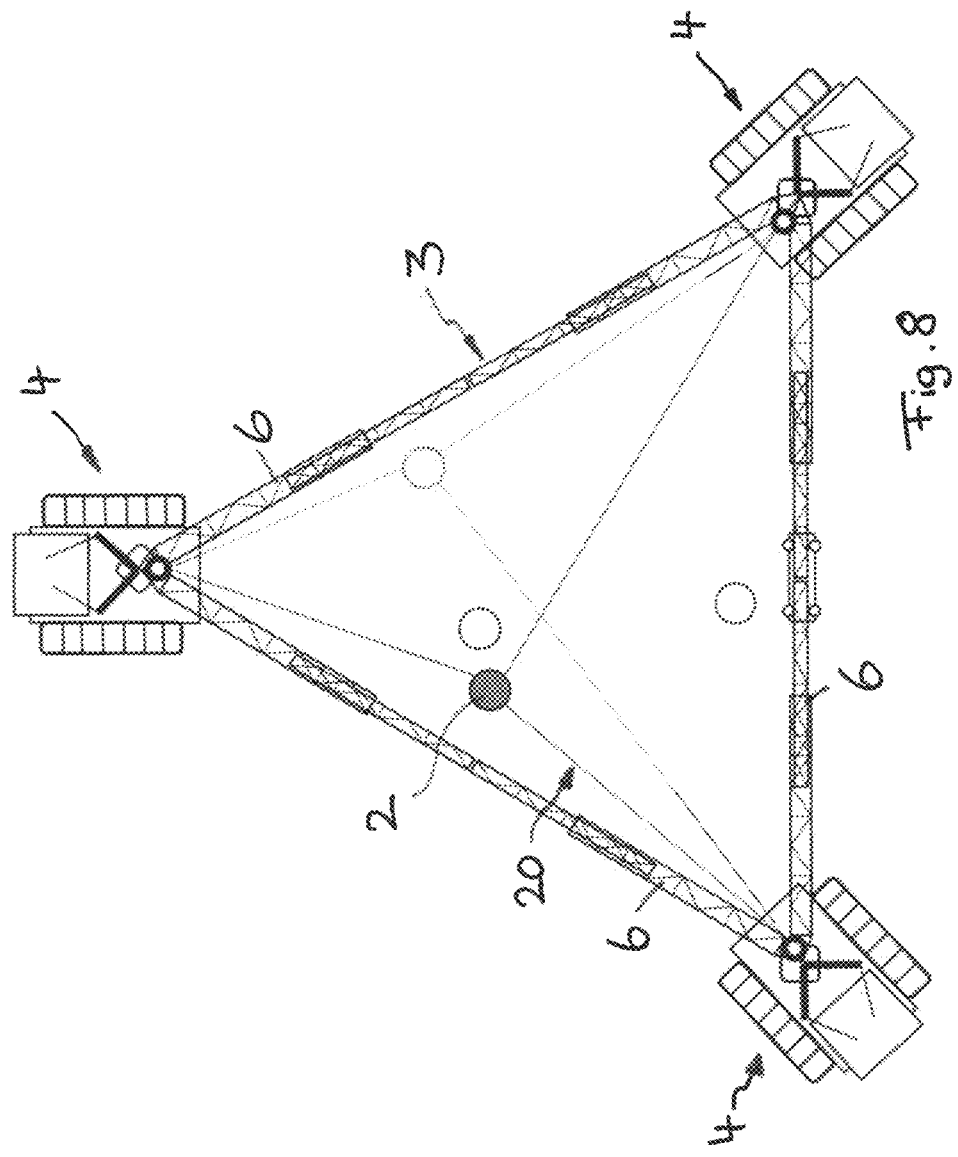
FIG. 8: a plan view of a supporting frame structure formed by three revolving tower cranes with booms attached to one another, wherein the working head, again similar to the design shown in FIG. 7, is articulated to the towers of the revolving tower cranes by means of a stranding system and can be adjusted by adjusting the control cables.

As FIGS. 7 and 8 show, the working head 2—or a further, additional working head—may also be suspended from and moved relative to the support frame structure 3 via a stranding 20 if necessary, which support frame structure 3 is also formed here by four or three revolving tower cranes 4 which are attached to one another via their booms 6.

As shown in FIG. 7, the system of cables 20 can comprise cables extending in four cardinal directions or in four different vertical planes, wherein advantageously two cables 21, 22 can be provided for each cardinal direction or each vertical plane, which can run from articulation points arranged at different heights, in particular can guide the working head 4 once diagonally upwards and once diagonally downwards in the respective cardinal direction or vertical plane, cf. FIG. 7.

Said articulation points of the stranding 20 can advantageously be provided on the towers 5 of the revolving tower cranes 4, in particular on upper and lower end sections, cf. FIG. 7. However, in order to be able to use the telescoping capability or height adjustability of the towers 5 without having to adapt the rope control system, it would also be conceivable to provide the articulation points of the stranding 20 only on the telescoping tower section. Alternatively, it would also be possible to provide at least the upper articulation points on the booms 6.

As FIG. 8 shows, such a stranding 20 may also be attached in a simple manner to a support frame structure 3 spanned or formed by only three revolving tower cranes 4, which revolving tower cranes 4 may here be attached to each other in an analogous manner via their booms 6 to form a rigid, stable support frame structure 3.

Said articulation points can be formed by deflection pulleys 23, via which the control cables 21 and 22 are deflected or guided to corresponding cable winches, by means of which the control cables 21 and 22 on each revolving tower crane 4 can be adjusted independently of one another, but nevertheless in coordination with one another. As shown in FIG. 7, the upper and lower articulation points can be offset sufficiently far from each other in height so that the working head 2 can be fixed or guided both upwards and downwards by the respective control cables 21 and 22. Nevertheless, it would also be possible, if necessary, to feed both control cables from above.

By linking the control cables 21 and 22 at different heights, as shown in FIG. 7, the working head 2 can be precisely guided in its alignment.

Independently of the suspension of the working head 2 via a system of cables 20 or via the movable crossbeam 14, an electronic control device 26 may be provided for moving and/or positioning the working head 2, which may control the respective travel drives, in particular the trolley travel drives and/or the travel drive of the cross beam carriage 16 and/or the height adjustment drive for adjusting the working head 2 relative to the cross beam 14 and/or the cable winches of the system of cables 20 on each revolving tower crane 4.

Advantageously, a local control unit 27 may be provided on each revolving tower crane 4, which may control the travel drives on the respective revolving tower crane 4 including the trolley drives and the aforementioned cable winches of the system of cables 20. The local control units 27, like the higher-level control device 26, may each be of electronic design, comprising, for example, a microprocessor and a program memory for executing one or more control routines in the form of a software module.

Advantageously, said local control unit 27 may not only control the traversing drives, but may also comprise a load monitoring module which monitors the tilting moment introduced into the respective revolving tower crane 4 and compares it with a maximum tilting moment. Advantageously, in order to coordinate the adjustment movements on the various revolving tower cranes 4, in particular the movement of the trolleys 15 and/or the telescoping of the towers 5 and/or the adjustment of the system of cables 20, the control device 26 comprises a higher-level or central control unit 28 which can communicate with the plurality of local control units 27. In particular, the plurality of local control units 27 can execute control commands from the central control unit 28 for the corresponding traversing drives, in particular for adjusting the trolleys 25 and for telescoping the towers in and out, and/or feedback traversing movements detected via a sensor system to the central control unit 28 in order to coordinate the adjustment of the traversing drives so that the working head 2 is moved in the desired manner.

Said central control unit 28 can thereby also control the other travel drives that are not specifically assigned to a revolving tower crane 4, in particular the travel of the cross beam carriage 16 and the height adjustment movements of the end beam 17.

Said higher-level control unit 28 can be a control device separate from all revolving tower cranes 4, for example in the form of a central control server, but alternatively can also be formed by one of the local control units 27, which in this case acts as a master control unit, so to speak.

As FIG. 2 illustrates, the control device 26, in particular the higher-level control unit 28, can also be connected to a central data server 29, in particular to a so-called BIM module, where BIM is an abbreviation for Building Information Model and contains a variety of relevant information for the building to be constructed, in particular CAD data, logistics plans, status data on parts of the building that have already been constructed, planning data, etc. The connection to such a BIM server 29 can be provided, for example, via a cloud with any access restrictions or barriers that may be provided. The connection to such a BIM server 29 can be provided, for example, via a cloud with any access restrictions or barriers that may be provided, see FIG. 2.

As FIG. 9 shows, the revolving tower cranes 4 forming the load-bearing structure can also grow with a building beyond their maximum telescopic or climb-in height by anchoring the revolving tower cranes 4 with their towers to the façade of an already erected part of the building by means of building anchors 50.

Once the respective revolving tower crane 4 has reached its maximum height, for example by telescoping or by inserting corresponding tower sections, the tower 5 of the crane can be dismantled from its slewing platform and/or its undercarriage and anchored to the already erected building façade by means of building anchors 50. In order to be able to grow further, a tower section below the climbing device can first be anchored to the façade with one or more building anchors so that another tower section can be climbed in. By moving or attaching additional building anchors to a building section or tower section that is further up, the tower 5 can continue to grow piece by piece while attached to the building section.

As FIG. 9 shows, a roof 30 supported by the cranes and/or a side wall 31 attached to a boom 6 or one or more towers 5 may also grow in height.

An auxiliary assembly crane 60 can be helpful in bringing in new tower sections to be climbed. Such an auxiliary crane 60 may advantageously take the form of an additional boom on one of the cranes forming part of the support structure 3. Such an auxiliary crane integrated into the support structure or a separate auxiliary crane 60 can also be used in supplying the construction site, which has grown in height, with building materials and/or tools and/or other materials.

We claim:

1. A construction and/or materials-handling machine for erecting a structure and/or manipulating a workpiece, comprising:
   a working head movably mounted on a supporting frame structure, wherein the supporting frame structure has at least three tower slewing cranes which each comprise an upright tower and at least one boom which is supported by the respective tower and is configured to be rotated about an upright slewing axis relative to the tower or together with the tower, wherein the tower slewing cranes are attached to one another by their booms and form a polygonal support frame,
   wherein the revolving tower cranes are each a mobile crane, wherein each mobile crane comprises an undercarriage with a travelling gear which is movable on the ground, and a rotary platform which is mounted on the undercarriage so as to be rotatable about an upright slewing gear axis and on which the tower of the revolving tower crane is mounted.

2. The construction and/or materials-handling machine of claim 1, wherein the undercarriage has a travel drive and/or the tower is mounted to rock relative to the rotary platform about a horizontal tower pivot axis and/or the tower and the boom are configured to be folded against one another.

3. The construction and/or materials-handling machine of claim 1, wherein the revolving tower cranes each comprise a telescopic tower which is height-adjustable by a length adjustment drive.

4. The construction and/or materials-handling machine of claim 1, wherein the booms of at least two revolving tower cranes are adjustable in length and telescopic.

5. The construction and/or materials-handling machine of claim 1, further comprising quick couplings for fastening the revolving tower cranes to one another, wherein the quick couplings are configured to positively lock and/or frictionally hold cantilevered boom end sections to an adjacent section of a respective adjacent revolving tower crane.

6. The construction and/or materials-handling machine of claim 5, wherein the quick couplings comprise form-fittingly engageable coupling halves which are fixable to each other by movable latching elements.

7. The construction and/or materials-handling machine of claim 6, wherein one coupling half of the quick couplings is at an end portion of each boom and the other coupling half is at the tower or at the boom of the respective adjacent tower.

8. The construction and/or materials-handling machine of claim 7, wherein the quick couplings are switchable between a first coupling mode and a second coupling mode, wherein in the first coupling mode the cantilevered boom end sections are rigidly fixed to the adjacent revolving tower crane and in the second coupling mode the cantilevered end sections are held on the adjacent revolving tower crane with limited elastic movement and/or play.

9. The construction and/or materials-handling machine of claim 6, wherein the quick couplings are switchable between a first coupling mode and a second coupling mode, wherein in the first coupling mode the cantilevered boom end sections are rigidly fixed to the adjacent revolving tower crane and in the second coupling mode the cantilevered end sections are held on the adjacent revolving tower crane with limited elastic movement and/or play.

10. The construction and/or materials-handling machine of claim 5, wherein the quick couplings are switchable between a first coupling mode and a second coupling mode, wherein in the first coupling mode the cantilevered boom end sections are rigidly fixed to the adjacent revolving tower crane and in the second coupling mode the cantilevered end sections are held on the adjacent revolving tower crane with limited elastic movement and/or play.

11. The construction and/or materials-handling machine of claim 1, wherein the working head is suspended on a crossbeam which is mounted on two booms of two revolving tower cranes so as to be longitudinally movable.

12. The construction and/or materials-handling machine of claim 11, wherein the crossbeam is attached to trolleys of two revolving tower cranes, wherein the trolleys are longitudinally movable along the booms of the two revolving tower cranes by trolley drives.

13. The construction and/or materials-handling machine of claim 12, wherein the cross member is variable in length, and wherein the cross member is telescopic.

14. The construction and/or materials-handling machine of claim 11, wherein the cross member is variable in length, and wherein the cross member is telescopic.

15. The construction and/or materials-handling machine of claim 1, wherein the working head is suspended on a cross beam carriage which is longitudinally movable along the cross beam by a carriage drive.

16. The construction and/or materials-handling machine of claim 15, wherein the working head is suspended from the cross beam carriage in a vertically adjustable manner.

17. The construction and/or materials-handling machine of claim 16, wherein the cross member is configured to cantilever beyond at least one of the cantilevers and forms a trajectory for the cross member carriage extending both inside and outside the polygon spanned by the booms.

18. The construction and/or materials-handling machine of claim 15, wherein the cross member is configured to cantilever beyond at least one of the cantilevers and forms a trajectory for the cross member carriage extending both inside and outside the polygon spanned by the booms.

19. The construction and/or materials-handling machine of claim 1, wherein the tower and boom of each revolving tower crane are supported exclusively on its rotary platform and/or are formed free of ground bracing anchored in the ground.

20. The construction and/or materials-handling machine of claim 1, wherein the tower is configured to be dismantled from the undercarriage and/or from the rotary platform of a respective revolving tower crane, further comprising building anchors for fastening and holding the tower with a dismantled rotary platform and/or a dismantled undercarriage to an erected building part.

21. The construction and/or materials-handling machine of claim 1, wherein a roof spanning a working area of the working head is attached to outriggers of the revolving tower cranes forming a polygonal tensile support frame, wherein the roof is attached to upper load-bearing straps of the boom.

22. The construction and/or materials-handling machine of claim 21, wherein the roof is adjustable between an extended position and a retracted position, and is retractable and extendable by a roof drive.

23. The construction and/or materials-handling machine of claim 22, wherein the roof is rollable in the manner of a sun awning and comprises a winding roller rotatably mounted on at least one boom of a revolving tower crane, and/or is a folding roof which has sliding guides on two opposite booms of the revolving tower cranes for sliding on the folding roof.

24. The construction and/or materials-handling machine of claim 1, wherein a side wall is attached to at least two towers of two adjacent revolving tower cranes.

25. The construction and/or materials-handling machine of claim 24, wherein the side wall is retractable in the manner of an awning and has a winding roller rotatably mounted on an extension arm connecting the two towers or on one of the two towers, and/or the side wall is a folding wall which has a sliding guide on the boom connecting the two towers or two sliding guides on the two towers for displacing the folding wall.

26. The construction and/or materials-handling machine of claim 1, further comprising an electronic control device for controlling travel drives, and wherein the travel drives comprise cross travel drives and/or a cross slide drive and/or a height adjustment drive and/or cable winch drives, for moving the working head relative to the support frame structure.

27. The construction and/or materials-handling machine of claim 26, wherein the electronic control device comprises a central control unit which is configured to communicate with local control units on the revolving tower cranes and configured to control the travel drives on the revolving tower cranes, wherein the central control unit is configured to prescribe setpoint values for the travel drive adjustment to the local control units.

28. The construction and/or materials-handling machine of claim 26, wherein the electronic control device has a communication interface for connection to a BIM server, and wherein planning and/or CAD and/or status data relating to the structure to be constructed are stored in the BIM server, and is configured to generate and/or adapt control commands for actuating traversing drives for adjusting the working head as a function of planning and/or CAD and/or status data received from the BIM server.

29. The construction and/or materials-handling machine of claim 1, wherein the electronic control device comprises a communication interface for connecting to a central server for providing and/or downloading various program packages, wherein the central server has access to an internal machine data database in which various machine data sets are stored, wherein the electronic control device is adapted to control the local control units by a received and/or downloaded program package from the central server.

30. A construction and/or materials-handling machine for erecting a structure and/or manipulating a workpiece, comprising:
a working head movably mounted on a supporting frame structure, wherein the supporting frame structure has at least three tower slewing cranes which each comprise an upright tower and at least one boom which is supported by the respective tower and is configured to be rotated about an upright slewing axis relative to the tower or together with the tower, wherein the tower slewing cranes are attached to one another by their booms and form a polygonal support frame,
wherein the revolving tower cranes each comprise a climbing device for climbing tower pieces into and out of the tower of the respective revolving tower crane.

31. The construction and/or materials-handling machine of claim 30, wherein the revolving tower cranes are each a mobile crane, wherein each mobile crane comprises an undercarriage with a travelling gear which is movable on the ground, and a rotary platform which is mounted on the undercarriage so as to be rotatable about an upright slewing gear axis and on which the tower of the revolving tower crane is mounted.

32. A construction and/or materials-handling machine for erecting a structure and/or manipulating a workpiece, comprising: a working head movably mounted on a supporting frame structure, wherein the supporting frame structure has at least three tower slewing cranes which each comprise an upright tower and at least one boom which is supported by the respective tower and is configured to be rotated about an upright slewing axis relative to the tower or together with the tower, wherein the tower slewing cranes are attached to one another by their booms and form a polygonal support frame,
wherein the working head is suspended by a system of cables comprising at least three control cables from the revolving tower cranes attached to each other, further comprising cable winches for adjusting the control cables relative to the revolving tower cranes and/or relative to the working head.

33. The construction and/or materials-handling machine of claim 32, wherein each tower of the revolving tower cranes comprises two articulation points for the articulation of two control cables, and wherein the two articulation points are spaced apart in height from one another so that the two control cables on the respective tower run in a common upright plane offset in height relative to one another with respect to the working head.

34. The construction and/or materials-handling machine of claim 33, wherein the two articulation points are at upper and lower end portions of the towers so that one control cable is configured to pull the working head upwards and the other control cable is configured to pull the working head downwards.

35. The construction and/or materials-handling machine of claim 34, wherein the control cables on the towers are deflected at the articulation points by cable pulleys and are guided to the cable winches, wherein the cable winches are in the region of the tower base and/or on a rotary platform of the respective revolving tower crane.

36. The construction and/or materials-handling machine of claim 35, wherein the control cables on the towers are deflected at the articulation points by cable pulleys and are guided to the cable winches, wherein the cable winches are in the region of the tower base and/or on a rotary platform of the respective revolving tower crane.

37. The machine of claim 32, wherein the revolving tower cranes are each a mobile crane, wherein each mobile crane comprises an undercarriage with a travelling gear which is movable on the ground, and a rotary platform which is mounted on the undercarriage so as to be rotatable about an upright slewing gear axis and on which the tower of the revolving tower crane is mounted.

* * * * *

UNITED STATES PATENT AND TRADEMARK OFFICE
CERTIFICATE OF CORRECTION

| | | |
|---|---|---|
| PATENT NO. | : 12,209,422 B2 | Page 1 of 1 |
| APPLICATION NO. | : 17/450010 | |
| DATED | : January 28, 2025 | |
| INVENTOR(S) | : Robert Bramberger et al. | |

It is certified that error appears in the above-identified patent and that said Letters Patent is hereby corrected as shown below:

On the Title Page

After the Related U.S. Application Data section, please add:
--(30) Foreign Application Priority Data
Apr. 5, 2019 (DE) 10 2019 109 019.9--

Signed and Sealed this
Fourth Day of March, 2025

Coke Morgan Stewart
*Acting Director of the United States Patent and Trademark Office*